(12) United States Patent
Kommer et al.

(10) Patent No.: US 10,789,700 B2
(45) Date of Patent: Sep. 29, 2020

(54) COMPOSITE MATERIALS ENABLING NON-DESTRUCTIVE TESTING

(71) Applicant: AIRBUS HELICOPTERS DEUTSCHLAND GMBH, Donauworth (DE)

(72) Inventors: Christian Kommer, Bissingen (DE); Markus Zellhuber, Oberndorf (DE); Philipp Meierling, Stadtbergen (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 90 days.

(21) Appl. No.: 16/288,649

(22) Filed: Feb. 28, 2019

(65) Prior Publication Data

US 2019/0266719 A1    Aug. 29, 2019

(30) Foreign Application Priority Data

Feb. 28, 2018    (EP) .................................. 18400007

(51) Int. Cl.
    *G06K 9/00*      (2006.01)
    *G06T 7/00*      (2017.01)
    (Continued)

(52) U.S. Cl.
    CPC ........ *G06T 7/0008* (2013.01); *B29C 65/8253* (2013.01); *B29C 65/8292* (2013.01); (Continued)

(58) Field of Classification Search
    CPC ......... G06T 7/0008; G06T 2207/10072; B29C 65/8253; B29C 65/8292; B29C 70/48; (Continued)

(56) References Cited

U.S. PATENT DOCUMENTS

| 3,956,631 A | 5/1976 | Crosby, Jr. |
| 5,340,423 A * | 8/1994 | Jacaruso ............. B29C 33/3842 156/158 |

(Continued)

FOREIGN PATENT DOCUMENTS

| DE | 102011080985 A1 | 2/2013 |
| EP | 1750123 A2 | 2/2007 |

(Continued)

OTHER PUBLICATIONS

European Search Report for EP 18400007, Completed by the European Patent Office, dated Sep. 12, 2018, All together 7 Pages.

*Primary Examiner* — Jonathan S Lee
(74) *Attorney, Agent, or Firm* — Brooks Kushman P.C.

(57) ABSTRACT

The invention is related to composite materials that enable the detection of imperfections through non-destructive testing. The composite material may include several constituent materials. One of these constituent materials may include cavities of a predetermined or random shape that are arranged at predetermined or random locations. Another constituent material may at least partially fill at least some of these cavities during manufacturing of the composite material. A method for non-destructively detecting imperfections in such a composite material may involve receiving an image of the composite material that shows at least some cavities and detecting imperfections in the composite material based on an inspection of the image.

14 Claims, 7 Drawing Sheets

(51) Int. Cl.
    *B32B 3/30*     (2006.01)
    *B32B 5/18*     (2006.01)
    *G01N 23/046*     (2018.01)
    *B29C 65/82*     (2006.01)
    *B29C 70/48*     (2006.01)

(52) U.S. Cl.
    CPC .................. *B32B 3/30* (2013.01); *B32B 5/18* (2013.01); *G01N 23/046* (2013.01); *B29C 70/48* (2013.01); *B32B 2266/0235* (2013.01); *B32B 2266/0278* (2013.01); *G01N 2223/419* (2013.01); *G01N 2223/615* (2013.01); *G01N 2223/652* (2013.01); *G06T 2207/10072* (2013.01)

(58) Field of Classification Search
    CPC ..... B32B 3/30; B32B 5/18; B32B 2266/0235; B32B 2266/0278; G01N 23/046; G01N 2223/419; G01N 2223/615; G01N 2223/652

USPC ........................................................ 382/108
    See application file for complete search history.

(56) References Cited

U.S. PATENT DOCUMENTS

| | | | |
|---|---|---|---|
| 6,923,931 B2* | 8/2005 | Dublineau | B23K 26/08 |
| | | | 264/414 |
| 9,604,403 B1 | 3/2017 | Wilenski et al. | |
| 2009/0235599 A1 | 9/2009 | Ware et al. | |
| 2013/0283920 A1* | 10/2013 | Lee | B29C 33/68 |
| | | | 73/649 |

FOREIGN PATENT DOCUMENTS

| | | |
|---|---|---|
| EP | 1750123 A3 | 2/2007 |
| EP | 2570255 A1 | 3/2013 |

\* cited by examiner

COMPOSITE MATERIALS ENABLING NON-DESTRUCTIVE TESTING

CROSS-REFERENCE TO RELATED APPLICATIONS

This application claims priority to European patent application No. EP 18400007.3 filed on Feb. 28, 2018, the disclosure of which is incorporated in its entirety by reference herein.

BACKGROUND OF THE INVENTION

(1) Field of the Invention

The invention is related to composite materials, and, more particularly, to a composite material that enables the detection of imperfections through non-destructive testing, and to a method for non-destructively detecting imperfections in such a composite material through the inspection of an image of the composite material.

(2) Description of Related Art

Safety-critical structural components made from composite materials are found in many places, such as high-rise buildings, hazardous material storage and transportation containers, petrochemical processing plants, nuclear power plants, aircrafts, spacecrafts, motor vehicles, construction machinery, just to name a few. Such safety-critical structural components often have predetermined fail-safe characteristics, and the likelihood for the occurrence of failure increases dramatically if imperfections in composite materials such as delamination and/or debonding and/or voids and/or porosities and/or improperly impregnated reinforcements with a transforming material, which is sometimes also referred to as dry areas in fibers and fabrics, are present. Therefore, there is a need to test these materials in order to detect imperfections, preferably by performing non-destructive testing (NDT).

Currently, several different non-destructive inspection methods are able to detect imperfections in test objects made from composite materials. Some of the existing non-destructive inspection methods to detect imperfections in test objects made from composite materials include visual inspection, ultrasonic pulse echo inspection, ultrasonic through-transmission, tap-test inspection, x-ray examination, computed tomography (CT) examination, thermography, and shearography.

Visual inspection can only detect imperfections and/or damage at the surface area of test objects made from composite materials. However, visual inspection fails to detect any imperfections in layers that lie under the surface area of the test object.

Ultrasonic pulse echo inspection is often used for detecting imperfections that lie under the surface of test objects made from composite materials. In a composite material, an ultrasonic sound wave will travel through the material until it reaches an air boundary. In normal conditions this air boundary will be the opposite surface of the composite material. When the composite material has an imperfection such as an unwanted thinning of the composite material or an air inclusion inside the composite material, caused for example by delamination of the structure, the echo will come from that imperfection. The difference in echo time is used to distinguish an undamaged from a damaged composite material.

Another variant of ultrasonic inspection is ultrasonic through-transmission. A sender may emit an ultrasonic sound wave that travels through the composite material until it reaches a receiver on the opposite surface. An imperfection such as a delamination or an air inclusion inside the composite material at least partially blocks the ultrasonic sound wave. The drop in intensity of the received ultrasonic sound wave is used to distinguish an undamaged from a damaged composite material.

Ultrasonic pulse echo and through-transmission inspection can also detect dry areas of fibers and fabrics of some composite materials that have not been properly impregnated with a matrix material. However, ultrasonic pulse echo and through-transmission inspection usually fails to identify dry areas of fibers and fabrics in multi-sandwich structures in which the ultrasonic pulse signal is dampened by some of the constituent materials.

Tap-test inspection is done with a hand-held device which usually consists of a hammer. The basic principle consists of tapping with the hand-held device at different areas of the composite material. An area with an underlying imperfection produces a different sound (i.e., resonance frequency) than an area that is free of imperfections due to a difference in stiffness. However, this method is limited in terms of the thickness of the composite material and the location of the imperfection, and imperfections that lie deep within the composite material are usually not detectable.

X-ray examination sends low-energy x-rays through the test object which are captured by an x-ray sensitive film that is placed under the test object. Analyzing discolorations of the film can be used to detect flaws in the test object such as a crushed core or to detect water in the core cells. However, x-ray examination is not suitable for detecting air inclusions or dry areas, and x-rays can only be used by staff adequately protected from the harmful effects of x-rays.

A CT examination is a variant of the x-ray examination that makes use of computer-processed combinations of many x-ray measurements taken from different angles to produce cross-sectional (i.e., tomographic) images (i.e., virtual slices) of specific areas of a scanned object, allowing the user to see inside the object without cutting. CT examination can also be used for detecting imperfections and/or defects in multi-sandwich structures. However, CT examination fails to distinguish between areas of fibers and fabrics that have not been properly impregnated with a matrix material and areas of fibers and fabrics that have been properly impregnated with a matrix material.

The thermography inspection method uses an external heat source to heat up the test object. Because of the low thermal conductivity and, therefore, low heat flow through composite materials, the heat distribution pattern can be used for damage detection in test objects made from such materials. Thermography is especially well-suited to detect delaminations and air inclusions close to the surface of a composite material and to detect water accumulation in composite sandwich panels of larger surfaces.

Shearography or Speckle pattern shearing interferometry is an optical method for detecting imperfections in different materials. A first optical image is obtained of the test object without any load on it. A second optical image is created by "shearing" the first optical image, and a superposition of the first and second images leads to a shear image. A small load is then applied to the test object and a third image is obtained, whereby a non-uniform test object generates a non-uniform movement of the surface of the test object. Software compares the shear image with the third image to detect imperfections in the test object. However, while this method has some application in detecting damage in honeycomb sandwich composite structures, it cannot detect delamination.

The document U.S. Pat. No. 9,604,403 B1 describes a method of assessing bond quality of a bond between first and second composite parts. The method may include bonding an indication film to the first composite part. The indication film may include NDI-detectable particles arranged in a pattern and bound to polymer chains located inside particle regions. The polymer chains and particles may be stationary during bonding of the indication film to the first composite part. The method may additionally include bonding the first and second composite parts along an assembly bondline during which the particles in the indication film migrate with the polymer chains. The method may further include NDI-inspection of the assembly bondline by observing the appearance of the particles along a direction locally normal to an in-plane direction of the assembly bondline, and determining the bond quality of the assembly bondline based on particle density in the in-plane direction.

The document DE 102011080985 A1 describes a method of testing a component made of a fiber composite material having many superposed layers of fibers. The method includes the steps of superposing the individual layers of fibers, where a grid of points from a contrast medium is applied on at least one of the finished part, which is not visible from the outside layer; producing the component from the superposed layers of fibers; and analyzing the component with a radiation analysis method. The document also describes a component made of a fiber composite material, which comprises many superposed layers of fibers.

The document U.S. Pat. No. 3,956,631 A describes a process for non-destructive inspection of a fusion bonded laminated article. The process comprises disposing a pattern of material on a fusible adhesive layer disposed between two layers of the article. The layers and adhesive are fused together wherein the fusing causes a distortion in the pattern. The article is examined for the presence of the distortion which presence manifests an acceptable bonded joint.

The document EP1750123 describes a method for calibrating an equipment for non-destructive testing of qualities of a composite article. The composite article has a partially cured layer, with small defects formed therein by drilling holes or hot pin sticking. The composite article has bonded layers.

The documents US2009235599 and EP2570255 are also cited.

Recently, the infusion or injection technology for manufacturing composite materials, in which the impregnation of fibers and fabrics with a matrix material is part of the manufacturing process, has become more and more important. In the case of a composite material having a multi-sandwich structure, none of the currently used and investigated means for non-destructive testing delivers satisfying results regarding the impregnation of reinforcements such as fibers and fabrics with a matrix material. However, proper impregnation of the reinforcements with a matrix material is required to ensure proper load carrying characteristics of the composite material. Verifying the proper impregnation of the reinforcements with a matrix material is hence required.

BRIEF SUMMARY OF THE INVENTION

Based on the limitations and drawbacks of the prior art, an objective of the present invention is to provide a new composite material that enables the detection of imperfections through non-destructive testing in a test object, and a new method for detecting imperfections through non-destructive testing in a test object made from such a composite material. This new composite material and this new method should provide an easy-to-operate solution for the commercial non-destructive testing of test objects made from composite materials produced in infusion and/or injection technology. In particular, the new composite material should enable the detection of areas of non-impregnation with a matrix material inside the composite material. This objective is solved by a composite material comprising the features of claim 1 and a method comprising the features of claim 10.

More specifically, a composite material may include a first constituent material and a second constituent material for non-destructively detecting imperfections in the composite material. The second constituent material may include a plurality of cavities that are arranged at predetermined locations and have a predetermined shape, and the first constituent material may at least partially fill at least some cavities of the plurality of cavities of the second constituent material.

According to one aspect, the composite material may be produced using a technology selected from the group consisting of infusion technology, injection technology, and a hybrid technology that combines infusion and injection technology.

According to one aspect, the first constituent material may include a matrix material.

According to one aspect, the composite material may further include a third constituent material that forms a sandwich layer with the second constituent material and is impregnated with the first constituent material.

According to one aspect, an unfilled cavity of the plurality of cavities may be indicative of a non-impregnated area of the third constituent material.

According to one aspect, the second constituent material may include foam.

According to one aspect, the second constituent material may include an indicator grid and hollow elements that are threaded on the indicator grid and form the plurality of cavities.

According to one aspect, a predetermined number of the plurality of cavities may be arranged in a regular pattern at a surface area of the second constituent material, which is in contact with the third constituent material.

According to one aspect, at least some of the predetermined number of the plurality of cavities have an opening at the surface area of the second constituent material.

According to one aspect, the second constituent material may have an additional surface area that is opposite the surface area, and at least some of the predetermined number of the plurality of cavities may be at a predetermined distance from the additional surface area.

Furthermore, a method for non-destructively detecting imperfections in the composite material may include receiving an image of the composite material, wherein the image shows at least some cavities of the plurality of cavities in the second constituent material, and detecting imperfections in the composite material based on an inspection of the image.

According to one aspect, detecting imperfections in the composite material based on an inspection of the image may further include evaluating, on the image, an inflation of the at least some cavities of the plurality of cavities with the first constituent material.

According to one aspect, evaluating, on the image, an inflation of the plurality of cavities with the first constituent material may further include determining whether at least a portion of the at least some cavities of the plurality of cavities shows an irregular pattern of inflation of the at least some cavities of the plurality of cavities with the first constituent material.

According to one aspect, evaluating, on the image, an inflation of the plurality of cavities with the first constituent material may further include: in response to determining that the at least a portion of the at least some cavities of the plurality of cavities shows an irregular pattern of inflation with the first constituent material, determining that the composite material has an area that lacks impregnation with the first constituent material, and determining that the composite material contains detectable imperfections.

According to one aspect, evaluating, on the image, an inflation of the plurality of cavities with the first constituent material may further include: in response to determining that none of the at least a portion of the at least some cavities of the plurality of cavities shows an irregular pattern of inflation with the first constituent material, determining that the composite material has no area that lacks impregnation with the first constituent material, and determining that the composite material is free of detectable imperfections.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1A:
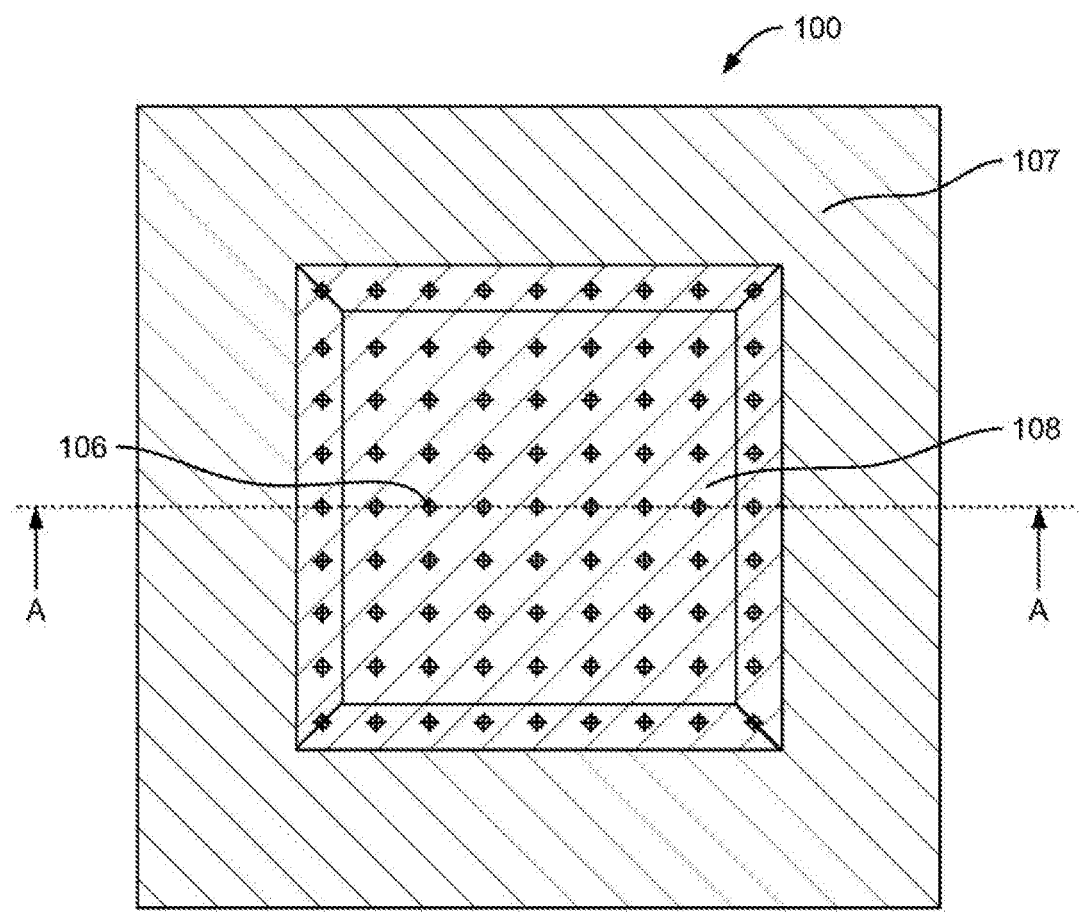
FIG. 1A is a diagram of an illustrative multi-sandwich composite material with a constituent material that includes cavities in accordance with some embodiments.
Figure 1B:
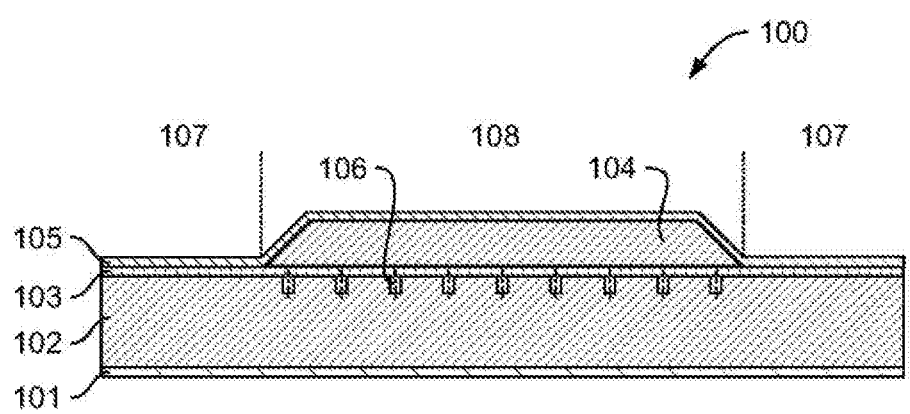
FIG. 1B is a diagram of an illustrative cross section of the multi-sandwich composite material of FIG. 1A in accordance with some embodiments.

FIG. 1A shows composite material 100 as a multi-sandwich composite material. FIG. 1B shows a cross section of composite material 100 of FIG. 1A cut along the line AA. As shown in FIGS. 1A and 1B, composite material 100 may include constituent materials 101, 102, 103, 104, and 105 that may each include one or more constituent materials. For example, constituent materials 101, 103, and 105 may form a skin using a matrix material, which is sometimes also referred to as a matrix phase or a background material, and a transforming material, which is sometimes also referred to as a reinforcement or a reinforcing phase. Examples for reinforcements include fibers and fabrics such as glass fibers, carbon fibers, aramid fibers, basalt fibers, flax, textiles, ceramic fibers, as well as carbon nanotubes, or any other reinforcement material that is suitable for forming a skin together with a matrix material. Examples for matrix materials include resins, polymers, ceramics, etc., or any other matrix material that is suitable for forming a skin together with a transforming material.

As shown in FIG. 1B, constituent material 104 may form a core between skins 103 and 105, and constituent material 102 may form a core between skins 101 and 103. Constituent materials 102 and 104 may include any suitable constituent material for forming a core such as polyurethane (PU) foam, polyvinyl chloride (PVC) foam, or other foams, honeycomb cores, woods, just to name a few.

If desired, composite material 100 may be produced using infusion technology, injection technology, or a hybrid technology that combines infusion and injection technology.

Infusion technology may involve a process in which the voids in an evacuated stack of constituent materials are filled with a matrix material (i.e., another constituent material), whereby the matrix material binds the assembly of constituent materials into a unified rigid composite material. For example, during manufacturing of composite material 100 using infusion technology, the constituent materials may be placed in a mold, air may be removed from the mold, and matrix material may be introduced into the mold to fill the voids left at evacuated locations, thereby inflating the constituent materials inside the mold and impregnating the transforming materials with the matrix material to form the skins 101, 103, and 105.

Proper impregnation of the entire transforming material with the matrix material (i.e., the absence of dry areas) may be required to ensure that composite material 100 achieves desired performances related to withstanding forces such as compression, torsion, tension, or shear, or have desired properties regarding strength, stiffness, resistance to fatigue damage, etc. Thus, improper impregnation (i.e., areas with only partial or no impregnation) of the transforming material with the matrix material may increase the risk of failure of composite material 100. Therefore, examination of proper impregnation of the transforming material with the matrix material through non-destructive testing is often required.

Visual inspection, tap tests, or other appropriate conventional non-destructive testing methods may ensure proper impregnation of skins 101 and 105 and of skin 103 in area 107 with the matrix material. To enable non-destructive testing of proper impregnation of skin 103 with the matrix material, constituent material 102 may include cavities 106 that are arranged at predetermined or random locations and have a predetermined or random shape. For example, cavities 106 may be located in areas in which skin 103 is at a predetermined or random distance from the surface of composite material 100 and/or in areas in which skin 103 is sandwiched between constituent materials 102 and 104 that form a core of the composite material (i.e., in area 108). If desired, constituent material 102 may be free of cavities in areas in which visual inspection, tap tests, or other appropriate conventional non-destructive testing methods may ensure proper impregnation of skin 103 (i.e., in area 107).

Constituent material 102 may include a predetermined number of cavities 106 that are arranged in a regular pattern (e.g., in a two-dimensional grid with equal distance between cavities in both directions). If desired, cavities 106 may be arranged in an irregular pattern. In some embodiments, cavities 106 may be arranged in a regular pattern in some areas and in an irregular pattern in other areas.

Cavities 106 may be located at a surface area of constituent material 102 that is in contact with skin 103. In some embodiments, at least some of the predetermined number of the plurality of cavities 106 have an opening at the surface area of constituent material 102.

Cavities 106 may have a predetermined shape. In some embodiments, all cavities may have the same predetermined shape. If desired, at least some cavities may have a predetermined shape that is different than the predetermined shape of the other cavities.

Properties of the predetermined shape may include the volume of the cavity, the size and shape of the opening, the depth, the cross-section size and shape at the different depths, etc. For example, cavities 106 may have a regular shape such as the shape of a cylinder, a cuboid, a pyramid, a cone, a sphere, a hemisphere or any other portion of a sphere, just to name a few. If desired, cavities 106 may have an irregular shape. As shown, cavities 106 may have a depth that is less than the thickness of constituent material 102, for example to prevent access to the cavities from both sides of constituent material 102. In other words, at least some of the cavities 106 may be at a predetermined distance from the surface area of constituent material 102 that is in contact with skin 101.

During manufacturing of composite material 100 using infusion technology, the constituent materials may be assembled in an airtight mold. If desired, applying vacuum on the assembly may evacuate air from the airtight mold, leading to an evacuation of cavities 106. During the infusion, the matrix material may at least partially fill or inflate cavities 106 in constituent material 102 when impregnating the reinforcement to form skin 103. Thus, an unfilled cavity of cavities 106 may be indicative of a non-impregnated area of the reinforcement in the area around the cavity, and an at least partially filled cavity of cavities 106 may be indicative of a proper impregnation of the reinforcement in the area around the cavity.

Figure 2A:
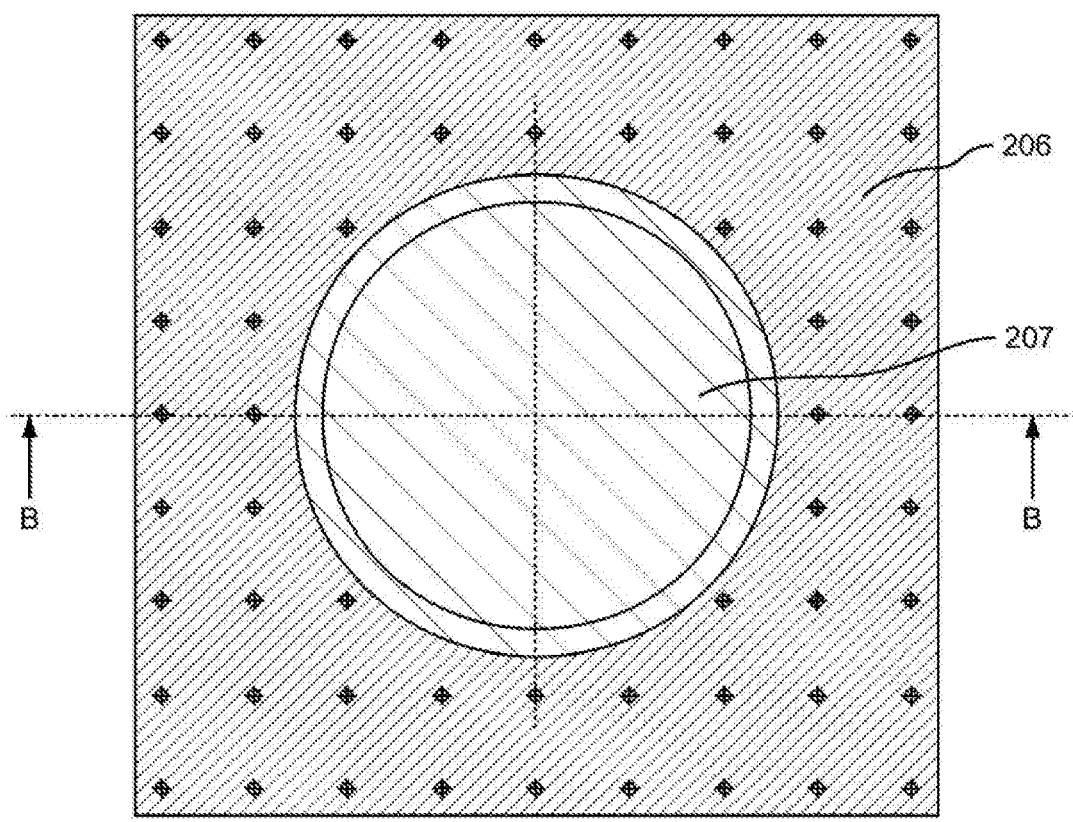
FIG. 2A is a diagram of an illustrative composite material with cavities in a thick monolithic area of a constituent material in accordance with some embodiments.
Figure 2B:
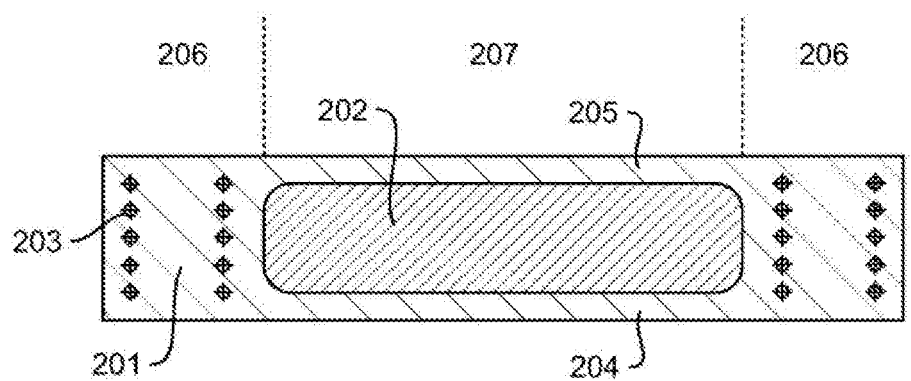
FIG. 2B is a diagram of an illustrative cross section of the composite material of FIG. 2A in accordance with some embodiments.

FIG. 2A shows a composite material with a core constituent material in area 207 and a thick monolithic portion in area 206. FIG. 2B shows a cross section of the composite material of FIG. 2A cut along the line BB. As shown in FIGS. 2A and 2B, the composite material may include constituent materials 201, 202, 204, and 205. If desired, constituent materials 201, 204, and 205 may include reinforcements that are impregnated with a matrix material.

Visual inspection, tap tests, or other appropriate conventional non-destructive testing methods may ensure proper impregnation of constituent materials 204 and 205 with the matrix material in area 207. To enable non-destructive testing of proper impregnation of the entire monolithic constituent material 201 with the matrix material in area 206, constituent material 201 may include cavities 203 that are arranged at predetermined locations and have a predetermined shape. For example, cavities 203 may be located in areas in which the reinforcement exceeds a predetermined thickness. If desired, constituent material 201 may be free of cavities in areas in which visual inspection, tap tests, or other appropriate conventional non-destructive testing methods may ensure proper impregnation of the reinforcement (e.g., close to the surface of constituent material 201).

Constituent material 201 may include a predetermined number of cavities 203 that are arranged in a regular pattern (e.g., in a two-dimensional grid with equal distance between cavities in both directions with several grids arranged in layers throughout the entire thickness of constituent material 201). If desired, cavities 203 may be arranged in an irregular pattern. In some embodiments, cavities 203 may be arranged in a regular pattern in some areas and in an irregular pattern in other areas and/or in a regular pattern in some dimensions and in an irregular pattern in other dimensions.

Cavities 203 may have a predetermined shape. In some embodiments, all cavities may have the same predetermined shape. If desired, at least some cavities may have a predetermined shape that is different than the predetermined shape of the other cavities.

Properties of the predetermined shape may include the volume of the cavity, the size and shape of the opening, the depth, the cross-section size and shape at the different depths, etc. For example, cavities 203 may have a regular shape such as the shape of a cylinder, a cuboid, a pyramid, a cone, a sphere, a hemisphere or any other portion of a sphere, just to name a few. If desired, cavities 203 may have an irregular shape.

During manufacturing of the composite material using infusion technology, the constituent materials may be assembled in an airtight mold. If desired, applying vacuum on the assembly may evacuate air from the airtight mold, leading to an evacuation of cavities 203. During the infusion, the matrix material may at least partially fill or inflate cavities 203 in constituent material 201 when impregnating the reinforcement. Thus, an unfilled cavity of cavities 203 may be indicative of a non-impregnated area of the reinforcement in the space around the cavity, and an at least partially filled cavity of cavities 203 may be indicative of a proper impregnation of the reinforcement in the space around the cavity.

Figure 3A:
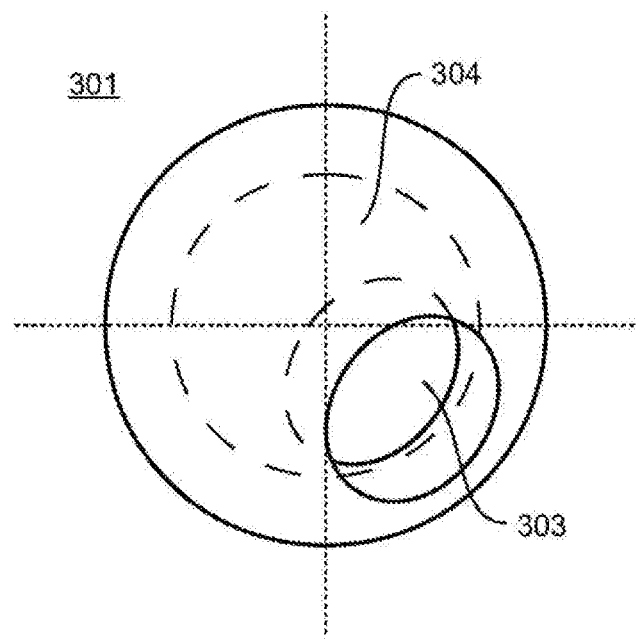
FIG. 3A is a diagram of an illustrative hollow element having a spherical shape in accordance with some embodiments.
Figure 3B:
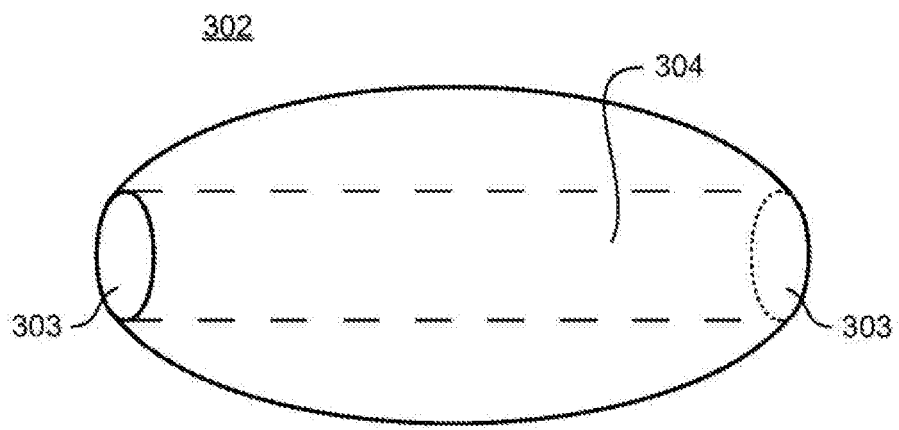
FIG. 3B is a diagram of an illustrative hollow element having a cylindrical shape in accordance with some embodiments.

FIGS. 3A and 3B are diagrams of illustrative hollow elements 301 and 302 that may serve as cavities 106 and/or 203 of FIGS. 1A and 1B and/or 2A and 2B, respectively. Hollow elements 301 and 302, which are sometimes also referred to as micro elements, may have at least one opening 303 with a cavity 304. As shown, cavity 304 of hollow element 301 has a spherical shape, while cavity 304 of hollow element 302 has a cylindrical shape.

Note that the size, shape, material and distribution of hollow elements 301 and/or 302 may depend on the desired properties of the composite material such as the size and number of allowable imperfections. In some embodiments, the size of hollow elements 301 and/or 302 may depend on the selected non-destructive testing method. For example, the volume of cavities 304 may decrease with an increase in the accuracy of the non-destructive testing method which may involve a higher resolution of the images made from the cavities.

Figure 4A:
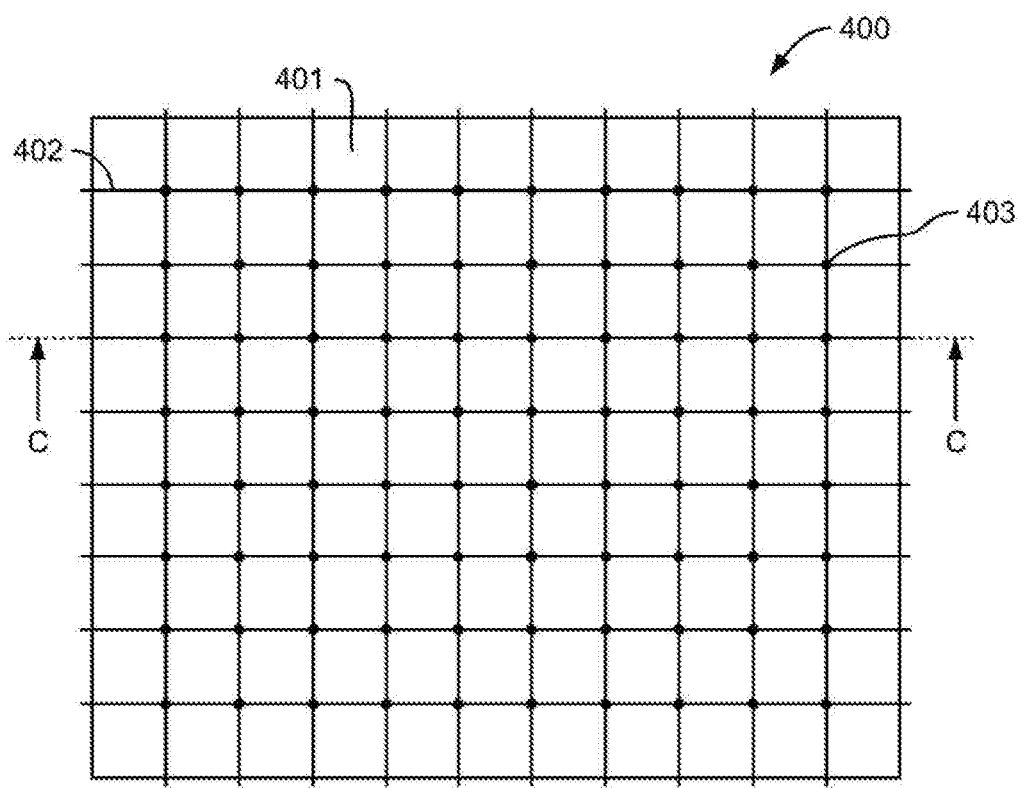
FIG. 4A is a diagram of an illustrative composite material with indicator grids between layers in accordance with some embodiments.
Figure 4B:
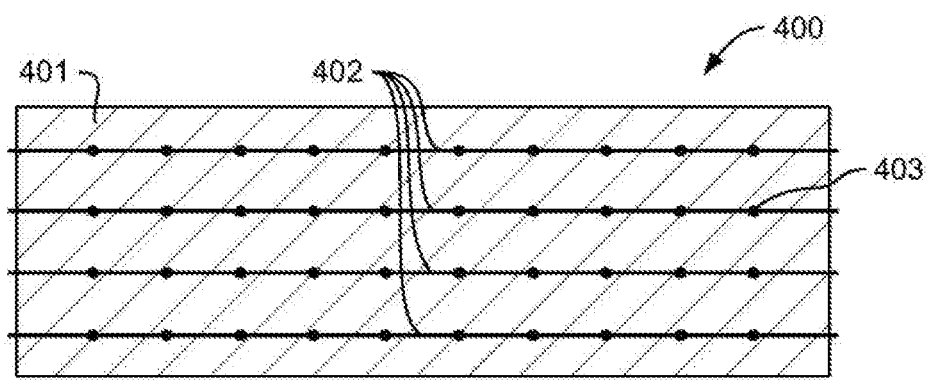
FIG. 4B is a diagram of an illustrative cross section of the composite material of FIG. 4A in accordance with some embodiments.

In some embodiments, several hollow elements 301 and/or 302 may be arranged to form an indicator grid. FIG. 4A is a diagram of an illustrative composite material 400 with indicator grids 402 in layers of monolithic constituent material 401. FIG. 4B shows a cross section of the composite material of FIG. 4A cut along the line CC. As shown in FIGS. 4A and 4B, the composite material may include constituent material 401, which may include reinforcements that are impregnated with a matrix material, and indicator grids 402.

Indicator grids 402 may include hollow elements 403 that are arranged at predetermined locations and have a predetermined shape. For example, hollow elements 403 may have the shape of hollow elements 301 FIG. 3A and/or the shape of hollow elements 302 of FIG. 3B. In some embodiments, hollow elements 403 may have more than one opening. If desired, indicator grids 402 may be located at predetermined distances from each other throughout the thickness of constituent material 401. For example, indicator grids 402 may be located at the same or at different distances from each other throughout the thickness of constituent material 401. The selection of the distance between indicator grids 402 may depend on constituent material 401 and/or the matrix material and/or the manufacturing conditions.

During manufacturing of composite material 400 using infusion technology, constituent material 401 and indicator grids 402 may be assembled in an airtight mold. During the infusion, the matrix material may at least partially fill or inflate hollow elements 403 in constituent material 401 when impregnating the reinforcement. Thus, an unfilled cavity of hollow elements 403 may be indicative of a non-impregnated area of the reinforcement in the space around the hollow element, and an at least partially filled cavity of hollow elements 403 may be indicative of a proper impregnation of the reinforcement in the space around the hollow element.

Figure 5:
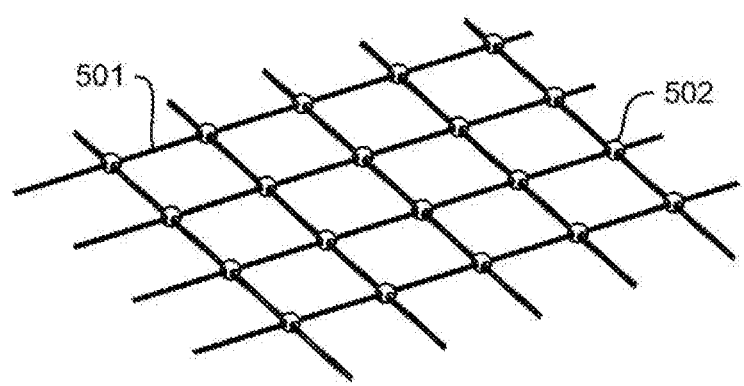
FIG. 5 is a diagram of an illustrative indicator grid in accordance with some embodiments.

FIG. 5 shows an illustrative indicator grid such as indicator grid 402 of FIGS. 4A and 4B. As shown, hollow elements 502 may be threaded on fibers 501 to provide a regular grid of cavities for integration into a composite material. If desired, hollow elements 502 may be distributed randomly on a carrier material. Size, shape, numbers of openings of hollow elements 502, distances between hollow elements 502, the size of indicator grid 501 and the distribution of indicator grids in a composite material may be adjusted to suit specific needs that may depend on the constituent material, and/or the matrix material and/or the manufacturing conditions.

Figure 6A:
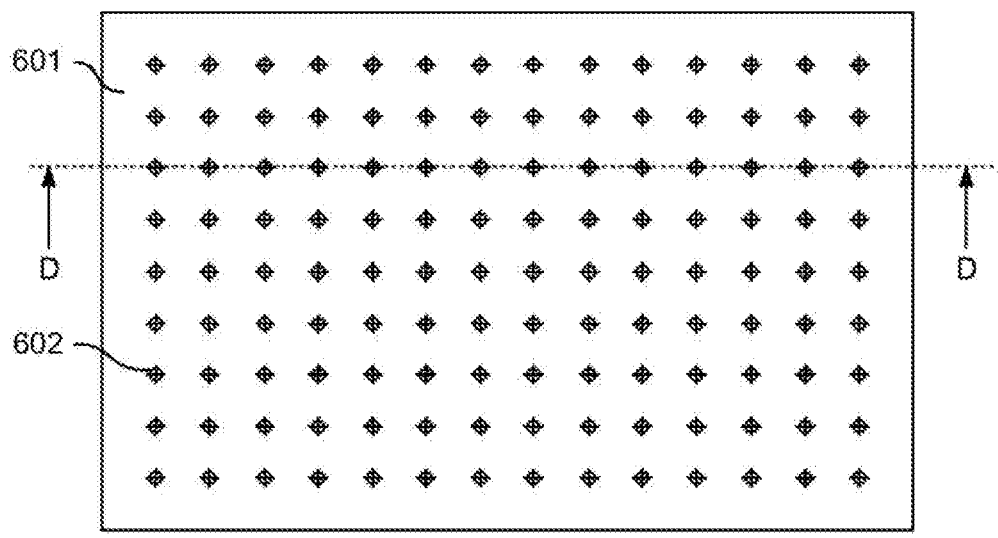
FIG. 6A is a diagram of an illustrative hybrid composite structure with integrated cavities in accordance with some embodiments.
Figure 6B:
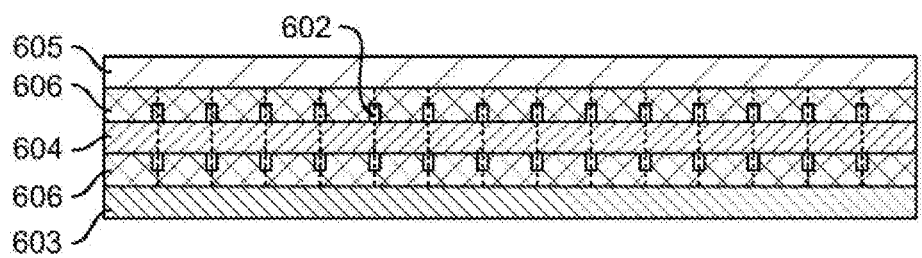
FIG. 6B is a diagram of an illustrative cross section of the hybrid composite structure of FIG. 6A in accordance with some embodiments.

FIG. 6A is a diagram of an illustrative hybrid composite material 601. FIG. 6B shows a cross section of the hybrid composite material of FIG. 6A cut along the line DD. As shown in FIGS. 6A and 6B, the hybrid composite material 601 may include reinforcements that form constituent materials 603, 604, and 605 together with a matrix material and layers of other laminate constituent materials 606 such as metal sheets or elastic materials that are sandwiched between constituent materials 603 and 604 and between constituent materials 604 and 605, respectively.

If desired, hybrid composite material 601 may be produced using infusion technology, injection technology, or a hybrid technology that combines infusion and injection technology.

Proper impregnation of the entire transforming material with the matrix material (i.e., the absence of dry areas) may be required to ensure that hybrid composite material 601 achieves desired performances related to withstanding forces such as compression, torsion, tension, or shear, or have desired properties regarding strength, stiffness, resistance to fatigue damage, etc. Thus, improper impregnation (i.e., areas with only partial or no impregnation) of the transforming material with the matrix material may increase the risk of failure of hybrid composite material 601. Therefore, examination of proper impregnation of the transforming material with the matrix material through non-destructive testing is often required.

Visual inspection, tap tests, or other appropriate conventional non-destructive testing methods may ensure proper impregnation of constituent materials 603 and 605 with the matrix material. To enable non-destructive testing of proper impregnation of constituent material 604 with the matrix material, laminate constituent material 606 may include cavities 602 that are arranged at predetermined locations and have a predetermined shape. For example, cavities 602 may be located where a constituent material that is to be impregnated with matrix material is sandwiched between laminate constituent materials (i.e., in between laminate constituent materials 606).

Laminate constituent material 606 may include a predetermined number of cavities 602 that are arranged in a regular pattern (e.g., in a two-dimensional grid with equal distance between cavities in both directions). If desired, cavities 602 may be arranged in an irregular pattern. In some embodiments, cavities 602 may be arranged in a regular pattern in some areas and in an irregular pattern in other areas.

Cavities 602 may be located at a surface area of constituent material 606 that is in contact with constituent material 604. In some embodiments, at least some of the predetermined number of the plurality of cavities 602 have an opening at the surface area of constituent material 606.

Cavities 602 may have a predetermined shape. In some embodiments, all cavities may have the same predetermined shape. If desired, at least some cavities may have a predetermined shape that is different than the predetermined shape of the other cavities.

Properties of the predetermined shape may include the volume of the cavity, the size and shape of the opening, the depth, the cross-section size and shape at the different depths, etc. For example, cavities 602 may have a regular shape such as the shape of a cylinder, a cuboid, a pyramid, a cone, a sphere, a hemisphere or any other portion of a sphere, just to name a few. If desired, cavities 602 may have an irregular shape. As shown, cavities 602 may have a depth that is less than the thickness of constituent material 606, for example to prevent access to the cavities from both sides of constituent material 606. In other words, at least some of the cavities 602 may be at a predetermined distance from the surface area of constituent material 606 that is in contact with constituent materials 603 and 605.

During manufacturing of hybrid composite material 601 using infusion technology, injection technology or a hybrid technology that combines infusion and injection technology, the constituent materials may be assembled in an airtight mold. If desired, applying vacuum on the assembly may evacuate air from the airtight mold, leading to an evacuation of cavities 602. During the infusion, the matrix material may at least partially fill or inflate cavities 602 in laminate constituent material 606 when impregnating the reinforcement to form constituent material 604. Thus, an unfilled cavity of cavities 602 may be indicative of a non-impregnated area of the reinforcement in the area around the cavity, and an at least partially filled cavity of cavities 602 may be indicative of a proper impregnation of the reinforcement in the area around the cavity.

Figure 7:
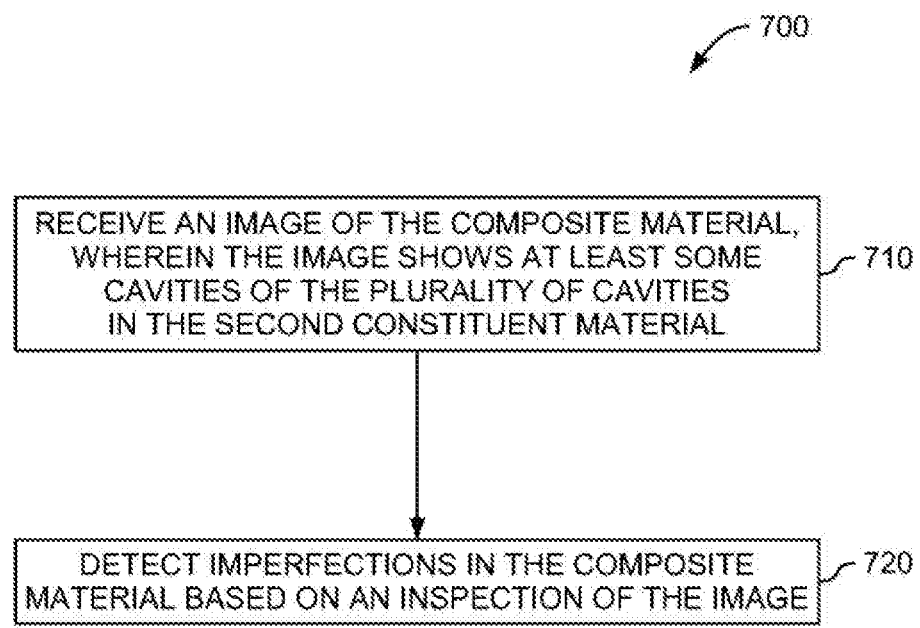
FIG. 7 is a diagram of a flowchart showing illustrative operations for non-destructively detecting imperfections in a composite material in accordance with some embodiments.

FIG. 7 is a diagram of a flowchart showing illustrative operations that test equipment may perform for non-destructively detecting imperfections in a composite material in accordance with some embodiments. During operation 710, the test equipment may receive an image of the composite material. The image may show at least some cavities in a constituent material. For example, the test equipment may receive an image of a CT examination. The CT examination may combine many x-ray measurements taken from different angles of composite material 100 of FIG. 1 to produce a cross-sectional image of cavities 106 in constituent material 102 of composite material 100.

During operation 720, the test equipment may detect imperfections in the composite material based on an inspection of the image. For example, the test equipment may evaluate an inflation of cavities 106 in constituent material 102 of composite material 100 of FIG. 1 with a matrix material.

Figure 8:
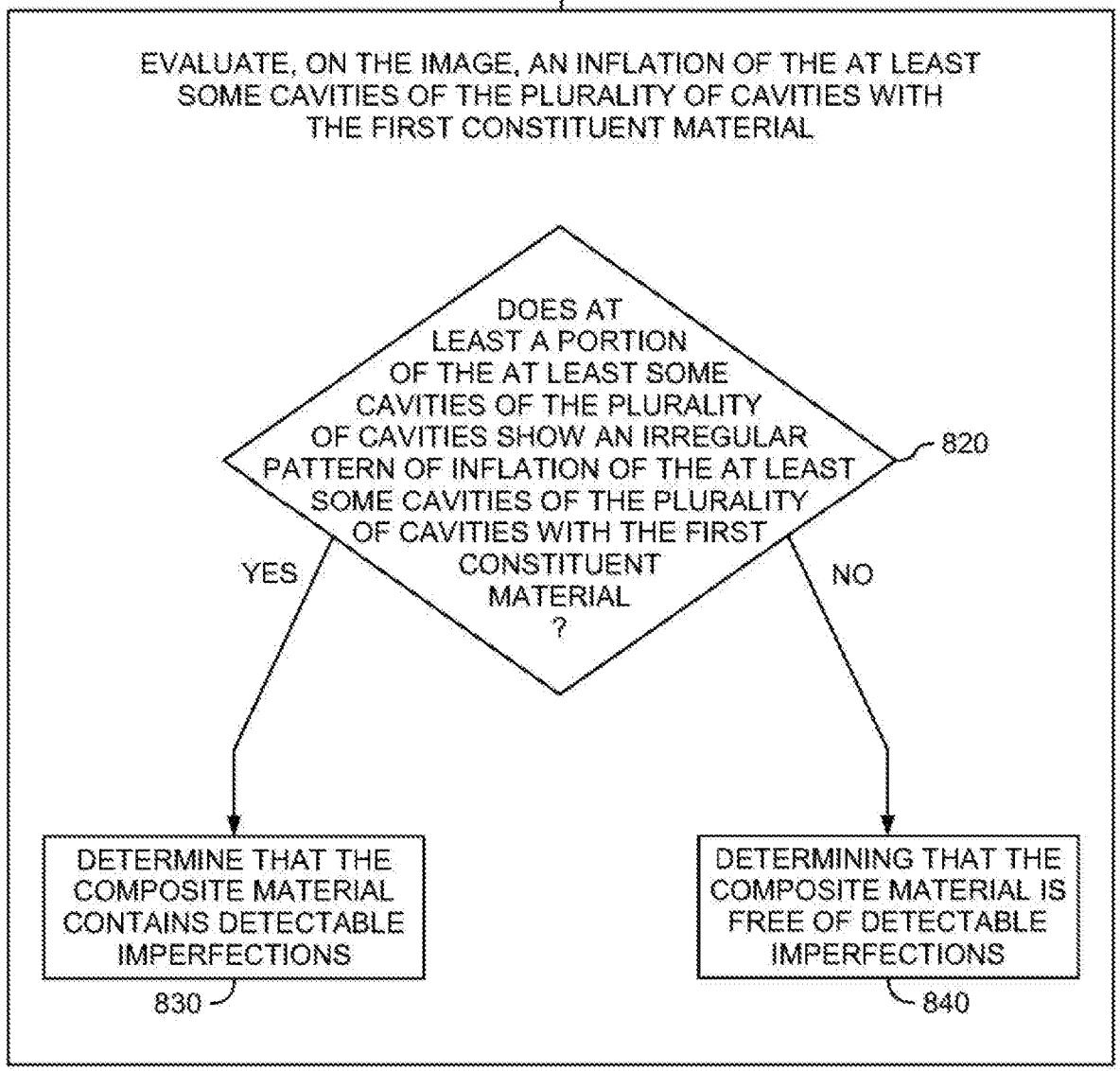
FIG. 8 is a diagram of a flowchart showing illustrative operations for evaluating an inflation of cavities with one of the constituent materials of the composite material in accordance with some embodiments.

FIG. 8 is a diagram of a flowchart showing illustrative operations that test equipment may perform when evaluating an inflation of cavities with a first constituent material of the composite material in accordance with some embodiments. During operation 810, the test equipment may evaluate, on the image, an inflation of the at least some cavities with the first constituent material. For example, during operation 820, the test equipment may determine whether at least a portion of the at least some cavities 106 of composite material 100 of FIG. 1 shows an irregular pattern of inflation of the at least some cavities with the first constituent material. If desired, the first constituent material may comprise a matrix material.

In response to determining that the at least a portion of the at least some cavities shows an irregular pattern of inflation with the first constituent material, the test equipment may determine that the composite material has an area that lacks impregnation with the first constituent material. As a result, the test equipment may determine during operation 830 that the composite material contains detectable imperfections.

In response to determining that none of the at least a portion of the at least some cavities shows an irregular pattern of inflation with the first constituent material, the test equipment may determine that the composite material has no area that lacks impregnation with the first constituent material. As a result, the test equipment may determine during operation 840 that the composite material is free of detectable imperfections.

It should be noted that the above described embodiments are merely described to illustrate possible realizations of the present invention, but not in order to restrict the present invention thereto. Instead, multiple modifications and variations of the invention are possible and should, therefore, also be considered as being part of the invention.

By way of example, cavities 106 of FIGS. 1A and 1B and/or cavities 203 of FIGS. 2A and 2B and/or cavities of hollow elements 403 of FIGS. 4A and 4B and/or cavities of hollow elements 502 of FIG. 5 may have any shape. For example, all cavities may have the same shape, some cavities may have different shapes, and/or all cavities may have different shapes. As an example, the cavities may have a spherical shape such as cavity 301 of FIG. 3A, a cylindrical shape such as cavity 302 of FIG. 3B, a conical shape, or any other suitable shape that enables the evaluation of an inflation of the cavities with a constituent material. Moreover, hollow elements 502 of FIG. 5 may be placed in between nodes of indicator grid 501, and/or indicator grid 501 may form shapes that are different than rectangular. For example, indicator grid 501 may form shapes that are hexagonal, octagonal, or have any other shape, including irregular shapes. Furthermore, a human may perform at least some operations of method 700 of FIG. 7 and/or at least some operations of method 810 of FIG. 8.

REFERENCE LIST 100 composite material
101, 103, 105 constituent material, skin (e.g., fiber)
102, 104 constituent material, core (e.g., foam)
106 cavities
107 area with direct bonding of 103 and 105
108 area with other constituent material between 103 and 105
201, 204, 205 constituent material, laminate, skin
202 constituent material, core
203 cavities
206 area with thick monolithic constituent material
207 area with other constituent material between 204 and 205
301, 302 hollow element
303 opening
304 cavity
400 composite material
401 monolithic constituent material
402 indicator grid
403 hollow element
501 indicator grid
502 hollow element
601 hybrid composite material
602 cavity
603, 604, 605 constituent material
606 laminate constituent material
700, 710, 720 method steps
810, 820, 830, 840 method steps

What is claimed is:

1. A composite material, comprising:
a first constituent material; and
a second constituent material for non-destructively detecting imperfections in the composite material,
wherein the second constituent material comprising an indicator grid and hollow elements that are threaded on the indicator grid and form a plurality of cavities; the first constituent material filling at least partially at least some cavities of the plurality of cavities of the second constituent material.

2. The composite material of claim 1, wherein the composite material is produced using a technology selected from the group consisting of infusion technology, injection technology, and a hybrid technology that combines infusion and injection technology.

3. The composite material of claim 2, wherein the first constituent material comprises a matrix material.

4. The composite material of claim 1, further comprising:
a third constituent material that forms a sandwich layer with the second constituent material and is impregnated with the first constituent material.

5. The composite material of claim 1, wherein an unfilled cavity of the plurality of cavities is indicative of a non-impregnated area of the third constituent material.

6. The composite material of claim 1, wherein the second constituent material comprises foam.

7. The composite material of claim 4, wherein a predetermined number of the plurality of cavities is arranged in a regular pattern at a surface area of the second constituent material, and wherein the surface area is in contact with the third constituent material.

8. The composite material of claim 1, wherein at least some of the predetermined number of the plurality of cavities have an opening at the surface area of the second constituent material.

9. The composite material of claim 1, wherein the second constituent material has an additional surface area that is opposite the surface area, and wherein at least some of the predetermined number of the plurality of cavities is at a predetermined distance from the additional surface area.

10. A method for non-destructively detecting imperfections in the composite material of claim 1, comprising:
 receiving an image of the composite material, wherein the image shows at least some cavities of the plurality of cavities in the second constituent material; and
 detecting imperfections in the composite material based on an inspection of the image.

11. The method of claim 10, wherein detecting imperfections in the composite material based on an inspection of the image further comprises:
 evaluating, on the image, an inflation of the at least some cavities of the plurality of cavities with the first constituent material.

12. The method of claim 10, wherein evaluating, on the image, an inflation of the plurality of cavities with the first constituent material further comprises:
 determining whether at least a portion of the at least some cavities of the plurality of cavities shows an irregular pattern of inflation of the at least some cavities of the plurality of cavities with the first constituent material.

13. The method of claim 12, wherein evaluating, on the image, an inflation of the plurality of cavities with the first constituent material further comprises:
 in response to determining that the at least a portion of the at least some cavities of the plurality of cavities shows an irregular pattern of inflation with the first constituent material, determining that the composite material has an area that lacks impregnation with the first constituent material; and
 determining that the composite material contains detectable imperfections.

14. The method of claim 12, wherein evaluating, on the image, an inflation of the plurality of cavities with the first constituent material further comprises:
 in response to determining that none of the at least a portion of the at least some cavities of the plurality of cavities shows an irregular pattern of inflation with the first constituent material, determining that the composite material has no area that lacks impregnation with the first constituent material; and
 determining that the composite material is free of detectable imperfections.

\* \* \* \* \*